(12) United States Patent
Hasunuma

(10) Patent No.: US 8,342,209 B2
(45) Date of Patent: Jan. 1, 2013

(54) PLUG FOR FLUID-TRANSFER COUPLING DEVICE

(75) Inventor: Masahiro Hasunuma, Gyoda (JP)

(73) Assignee: Surpass Industry Co., Ltd., Gyoda-Shi, Saitama (JP)

( * ) Notice: Subject to any disclaimer, the term of this patent is extended or adjusted under 35 U.S.C. 154(b) by 543 days.

(21) Appl. No.: 12/096,094

(22) PCT Filed: Dec. 5, 2006

(86) PCT No.: PCT/JP2006/324626
§ 371 (c)(1),
(2), (4) Date: Jun. 4, 2008

(87) PCT Pub. No.: WO2007/066797
PCT Pub. Date: Jun. 14, 2007

(65) Prior Publication Data
US 2009/0272450 A1    Nov. 5, 2009

(30) Foreign Application Priority Data
Dec. 5, 2005  (JP) ................................. 2005-351239

(51) Int. Cl.
*F16L 55/10*    (2006.01)
(52) U.S. Cl. .......................................... 138/89; 138/90
(58) Field of Classification Search ................ 138/89, 138/90
See application file for complete search history.

(56) References Cited

U.S. PATENT DOCUMENTS

| 2,986,958 | A | * | 6/1961 | Mueller et al. | 408/139 |
| 3,179,446 | A | * | 4/1965 | Paterson | 277/620 |
| 3,207,184 | A | * | 9/1965 | Lambert | 138/89 |
| 3,425,452 | A | * | 2/1969 | Shaw | 138/89 |
| 4,019,541 | A | * | 4/1977 | Koppl | 138/94 |
| 4,064,912 | A | * | 12/1977 | Petrone | 138/94 |
| 5,904,377 | A | * | 5/1999 | Throup | 285/39 |
| 2009/0267346 | A1 | * | 10/2009 | Hasunuma | 285/316 |
| 2010/0001517 | A1 | * | 1/2010 | Hasunuma | 285/315 |

* cited by examiner

*Primary Examiner* — James Hook
(74) *Attorney, Agent, or Firm* — Millen, White, Zelano & Branigan, P.C.

(57) ABSTRACT

In a fluid-transfer coupling device (5) that connects a plug (70) and a socket (10) to each other to communicate respective flow paths in the socket and the plug with each other, the plug includes, at least, an inner spacer (74) having an inner passage (78) formed to allow a passage of fluid, a plug collar (73) covering the outer circumferential surface of the inner spacer and a flange (75) formed on a proximal end of the plug to connect the plug to a conduit. The plug collar and the flange are made of metal. Consequently, even if the flow rate of the fluid is large, the plug can be firmly supported in the device. The inner spacer is made of a resinous material. In this connection, at least one portion of an outer circumferential portion of the plug may be formed of metal.

6 Claims, 10 Drawing Sheets

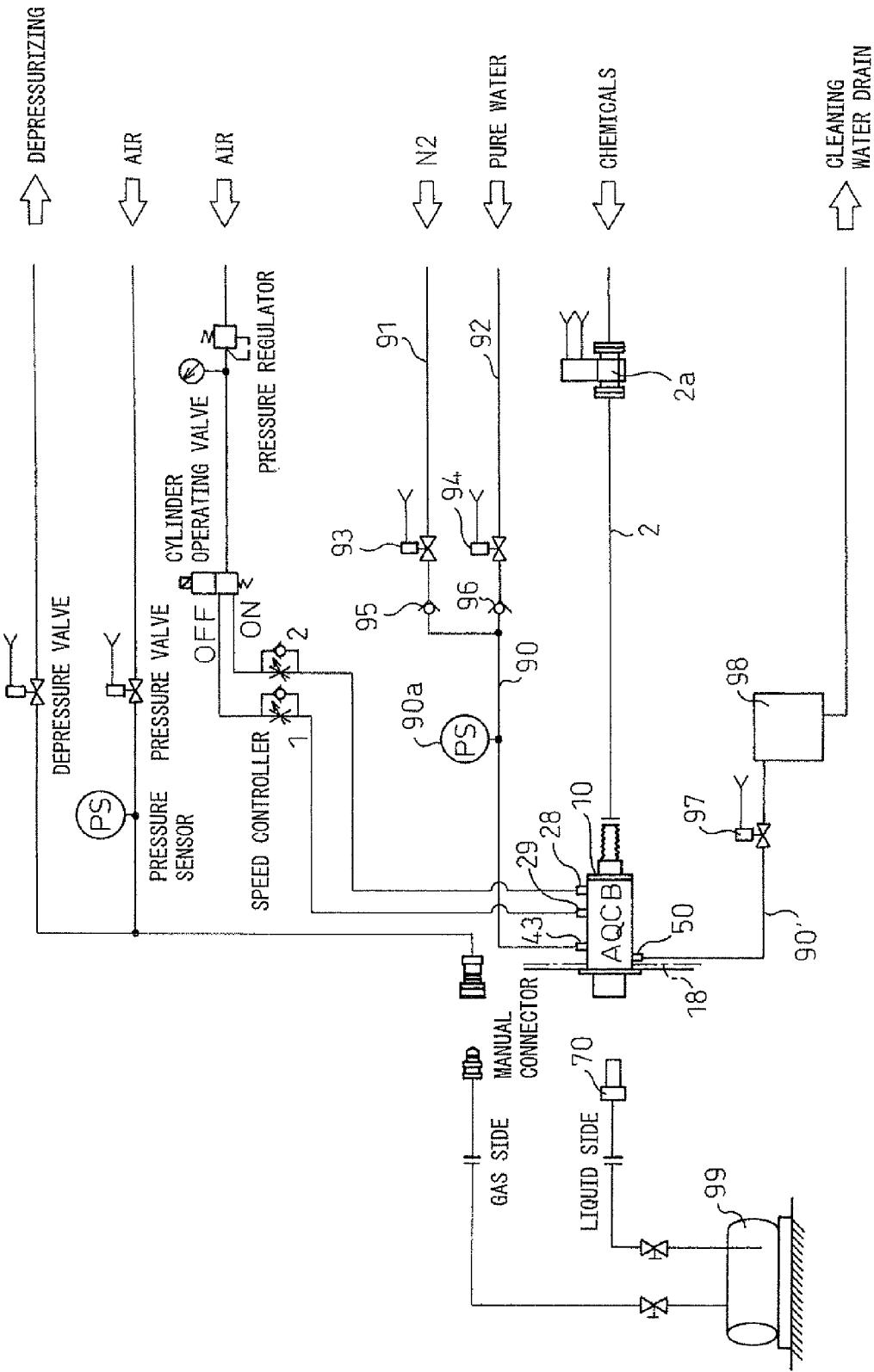

PLUG FOR FLUID-TRANSFER COUPLING DEVICE

TECHNICAL FIELD

The present invention relates to a plug for a socket in a fluid-transfer coupling device which is used in transferring fluid from a storage tank in a production plant to a container on a carrier track. The fluid to be transferred may be a liquid (e.g. high-purity chemicals as typified by an etching liquid used in manufacturing semiconductors), gas or other fluids.

BACKGROUND ART

Japanese Patent Publication No. 2921654 discloses a coupling device used for the above application. Such a coupling device includes a socket (immovable female coupler) and a plug (movable male coupler). Conduits are connected to the socket and the plug, respectively.

The socket is equipped with a circumferential side flange. By attaching the side flange to a mount panel, the socket is secured while being connected to the conduit. When the plug connected to the other conduit is inserted into the socket, the plug and the socket are arranged in a line. With an operation of an inner mechanism built in the socket previously, the respective conduits of the socket and the plug are communicated with each other, so that fluid is transferred.

However, when the conduit is connected to the plug, and fluid is transferred for a relatively long period of time while the plug is inserted into the socket, the plug is subjected to a moment of force due to the weight of a flange or the like attached to the rear end of the plug. As a result, there is a possibility that not only the valve sealing characteristics of the plug, but also the sealing characteristics of the socket deteriorate.

Additionally, the plug is required to be inserted into the socket every time fluid is transferred, a portion of the plug engaging the socket is easily worn.

This invention has been achieved in view of the above situation, and an object thereof is to provide a plug for a fluid-transfer coupling device, which can be firmly supported in the socket, especially, even when the flow rate of fluid is relatively large.

DISCLOSURE OF THE INVENTION

In order to attain the above object, according to a first aspect of the present invention, there is provided a plug for a fluid-transfer coupling device that connects the plug and socket to each other thereby communicating respective flow paths in the socket and plug with each other, wherein at least one portion of an outer circumferential portion of the plug is made of metal.

According to a second aspect of the present invention, there is also provided a plug for a fluid-transfer coupling device that connects the plug and socket to each other thereby communicating respective flow paths in the socket and the plug with each other, the plug comprising at least: an inner spacer having an inner passage formed to allow a passage of fluid; a plug collar covering the outer circumferential surface of the inner spacer; and a flange formed on a proximal end of the plug to connect the plug to a conduit, wherein the plug collar and the flange are made of metal.

In the first aspect and the second aspect, as the outer circumference of the plug is reinforced by metal, the rigidity of the entire plug is enhanced. As a result, even if the flow rate of the fluid is relatively large, the plug can be firmly supported and it is possible to prevent the plug from being damaged. In connection with the second aspect, it is preferable that the inner spacer be made from a resinous material having chemical resistance.

According to a third aspect of the invention, as in the second aspect, the inner spacer is provided, at a proximal end thereof, with a circular projection extending in the circumferential direction of the inner spacer, and the circular projection is interposed between a proximal end of the plug collar and a circular step part of the flange.

In the third aspect of the invention, as the inner spacer is interposed between the proximal end of the plug collar and the circular step part of the flange, it is possible to firmly hold the inner spacer. Further, in the third aspect, it is possible to manufacture the flange as a single member without forming it by two divided members, thereby reducing manufacturing cost.

According to a fourth aspect of the invention, as in the second aspect or the third aspect, the plug further comprises a plug forward part having an inner passage formed to communicate with the inner passage of the inner spacer, wherein a seal part is formed between the plug forward part and the inner spacer.

In the fourth aspect of the invention, it is possible to prevent the fluid flowing in the plug from leaking out through a space between the forward plug part and the inner spacer.

According to a fifth aspect of the invention, as in any of the second to the fourth aspects, a gap suitable for receiving a finger of an operator is defined between the flange of the plug and the socket when the plug is connected to the socket.

In the fifth aspect of the invention, as an operator's grasping of the plug is facilitated, it is possible for the operator to easily connect and disconnect the plug.

According to a sixth aspect of the invention, as in any of the second to the fifth aspects, the inner spacer includes a first part positioned on the side of a forward end of the plug and a second part arranged between the first part and the flange, and only the second part and the flange are separated from the plug in an assembled state.

In the sixth aspect of the invention, it is possible to replace the flange with another flange of a different size without disassembling the entire plug.

According to a seventh aspect of the invention, as in the sixth aspect, a seal part is formed between the first part and the second part.

In the seventh aspect of the invention, it is possible to enhance the sealing characteristics of the plug.

BRIEF DESCRIPTION OF THE DRAWINGS

FIG. 8 is a flow diagram in which the coupling device of the present invention is arranged;

FIG. 9b is an end view of the plug shown in FIG. 9a;

FIG. 10a is a longitudinal sectional view of the plug mounted on a different flange from that of FIG. 9a; and FIG. 10b is an end view of the plug of FIG. 10a.

BEST MODE FOR CARRYING OUT THE INVENTION

Figure 1:
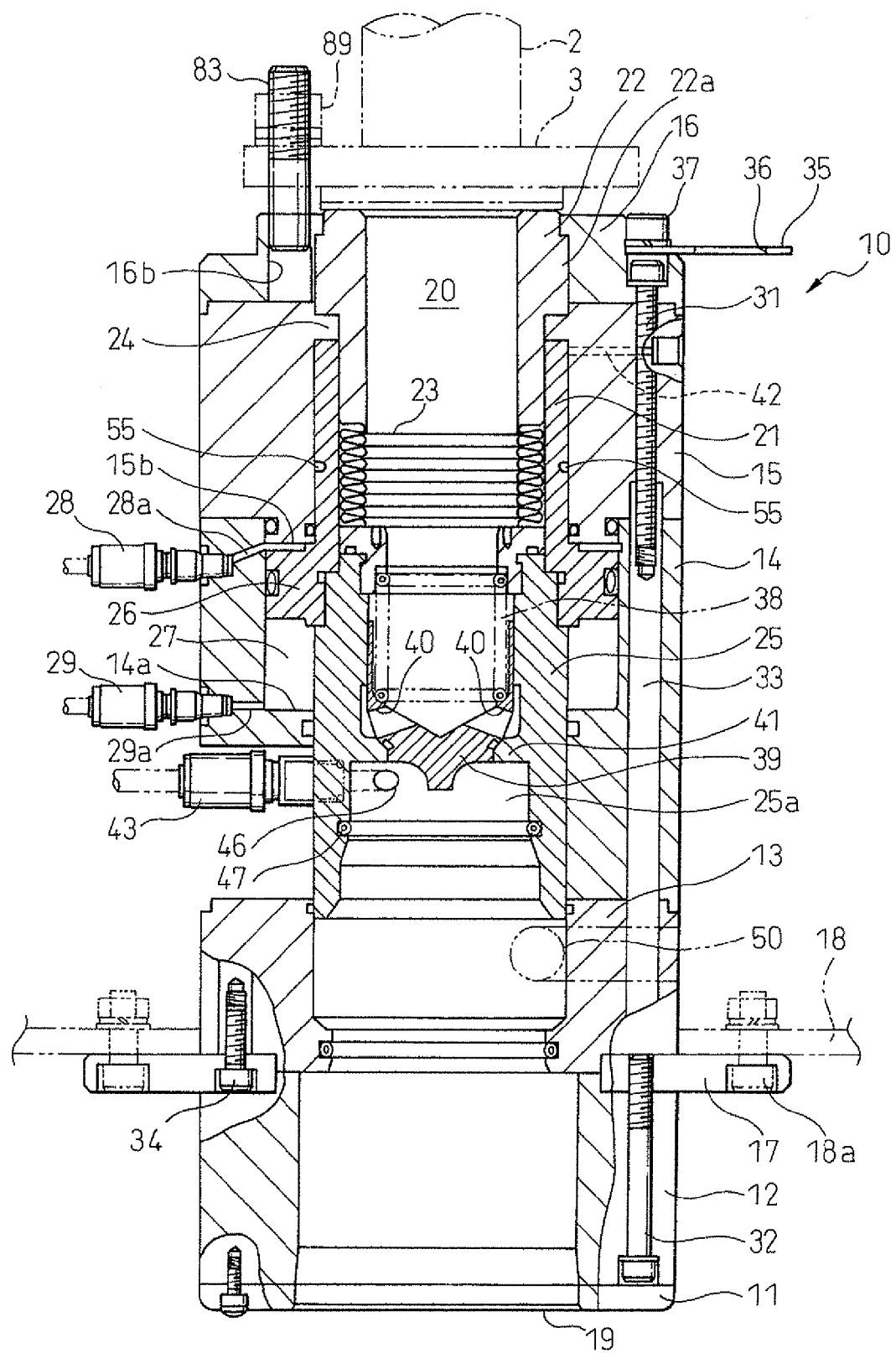
FIG. 1 is a longitudinal sectional view of a socket for a fluid-transfer coupling device in accordance with the present invention.

Embodiments of the present invention will be described below with reference to drawings. In the drawings below, similar elements are indicated with similar reference numerals respectively. For ease of understanding, the drawings have been appropriately modified in scale size.

Figure 2:
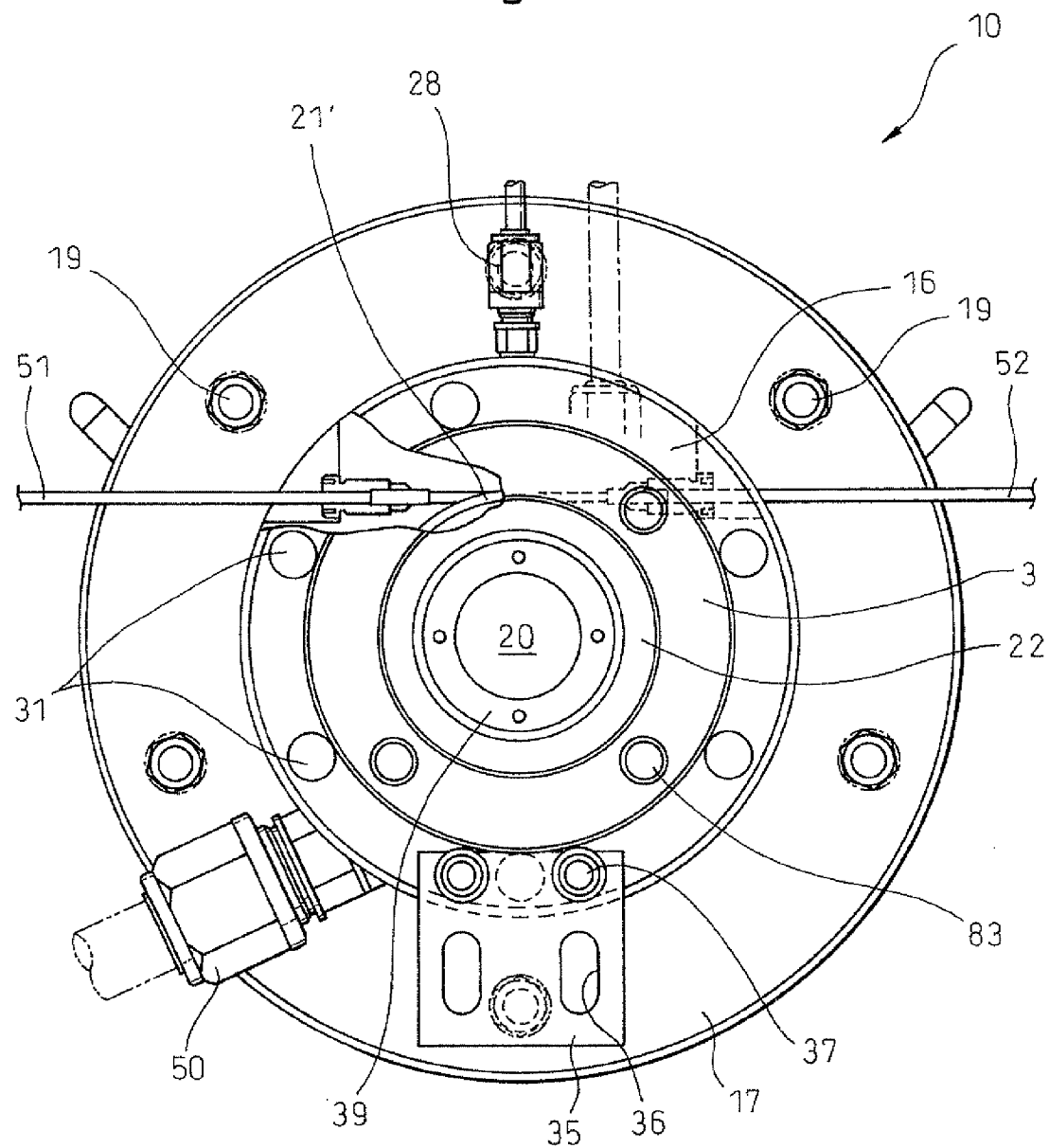
FIG. 2 is an end view of the socket for the fluid-transfer coupling device in accordance with the present invention.

FIG. 1 is a longitudinal sectional view of a socket for a fluid-transfer coupling device in accordance with the present invention, while FIG. 2 is an end view of the socket for the fluid-transfer coupling device of the present invention. A housing of the socket 10 mainly includes housing components 12, 13, 14, 15 assembled to each other integrally. As shown in the figures, the housing component 12 has one end fixed to a front cover 11 and the housing component 15 has one end fixed to a rear cover 16. In the present invention, the housing of the socket 10 is formed by the front cover 11, the housing components 12 to 15 and the rear cover 16. Preferably, these housing components are made from resinous material having chemical resistance, for example, fluorocarbon resin.

As shown in FIG. 1, a side flange 17 is arranged between the housing component 12 and the housing component 13. The side flange 17 serves to fix the socket 10 to a mount panel 18. In addition, a later-mentioned plug 70 is inserted into an entry 19 formed by the housing component 12 and the front cover 11, etc.

In the vicinities of the outer circumferential surfaces of respective end surfaces of the housing components 12 to 15 and the inner circumferential surfaces of end surfaces of the side flange 17, a plurality of holes are formed at regular intervals in the circumferential direction. In assembling the housing of the socket 10, connecting rods 33 are inserted into the holes of the housing components 14, 15 while aligning respective spigot-and-socket portions of the housing components 14, 15 with each other. Then, bolts 34 are inserted into the holes of the side flange 17 and the housing component 13 and screwed into respective one ends of the connecting rods 33. Then, bolts 31 are inserted into the holes of the rear cover 16 and the housing component 15 and screwed into the other ends of the connecting rods 33. Finally, bolts 32 are inserted into the holes of the housing component 12 and screwed into the side flange 17. In this way, the housing of the socket 10 is assembled.

Preferably, the connecting rods are made from metal. This results in an increase in rigidity of the socket 10 as a whole. Therefore, even if a relatively-large load is applied on the side flange 17 by an operator when using the socket 10, there is no possibility that the side flange 17 rotates. Additionally, it is also possible to prevent the occurrence of reduced sealing capability or clattering in the housing of the socket.

As shown in FIG. 1, a bellows holder 21 is slidably arranged along respective inner circumferential surfaces of the housing components 14, 15. A bellows 23 is arranged inside the bellows holder 21. The bellows 23 has one end formed integrally with a proximal end adaptor 22 engaging with the rear cover 16. As shown in the figure, the proximal end adaptor 22 has a broad portion 22a engaged in a concave part formed on the inner circumferential surface of the rear cover 16. As the broad portion 22a also abuts on a step part 24 of the housing component 15, the proximal end adaptor 22 is securely arranged in the socket 10.

On the forward end of the bellows holder 21, a piston 26 in the form of a flange is formed integrally with the outer circumferential surface of the bellows holder 21. As shown in the figure, a sliding chamber 27 is defined between a forward end 15b of the housing component 15 and a step part 14a of the housing component 14, so that the piston 26 integrated with the bellows holder 21 slides in the sliding chamber 27. The step part 14a and the forward end 15b serve as stopper elements for the piston 26. Thus, a distance obtained by subtracting a thickness of the piston 26 from an interval between the step part 14a and the forward end 15b is equivalent to a stroke of the piston 26.

The other end of the bellows 23 is connected to a shower ring 25. The shower ring 25 made from fluorocarbon resin or polyvinyl chloride, etc. is secured on the bellows holder 21. When the piston 26 is sliding, the shower ring 25 slides along the inner circumferential surfaces of the housing components 13, 14. In addition, the bellows holder 21 slides along the inner circumferential surface of the housing component 15 at the sliding of the piston 26. In the vicinity of the step part 24, further, a drain 42 is formed to discharge fluid stored in a sliding chamber 21' of the bellows holder 21.

Further, intake and exhaust ports 28a, 29a are formed so as to extend from both ends of the sliding chamber 27 to the outer circumferential surface of the housing component 14 and also connected to intake and exhaust nozzles 28, 29, respectively. As can be seen from FIG. 1, the piston 26 is arranged, in the sliding chamber 27, between the intake and exhaust ports 28a, 29a. Therefore, if the sliding chamber 27 is supplied with air pressure through the intake and exhaust port 28 in a state of FIG. 1, the piston 26 is pushed by air and slid until its arrival at the step part 14a. At this time, air in the sliding chamber 27 is discharged from the intake and exhaust port 29. When this pneumatic relationship of entrance and exit is switched between the intake and exhaust ports 28, 29, the piston 26 and the bellows holder 21 move toward the proximal end of the socket 10 until they arrive at the forward end 15b and the step part 24, respectively.

In the vicinity of the center of the shower ring 25, a first valve seat 41 is formed so as to project inwardly. A first valve body 39 is urged toward the first valve seat 41 by a spring 38 arranged between the first valve body 39 and the bellows 23. In the normal state, the first valve body 39 closes an opening of the first valve seat 41. Additionally, as shown in the figure, the first valve body 39 is formed with a communication hole 40. When the first valve body 39 is pushed against the urging of the spring 38, the communication hole 40 and the opening of the first valve seat 41 are opened together.

Inside the shower ring 25, a cleaning chamber 25a is formed with a circular section, on the forward end side of the ring 25. In an inner surface of the cleaning chamber 25a, a nozzle hole 46 is formed so as to open in a tangential direction of the cleaning chamber 25a. This nozzle hole 46 is communicated with a shower nozzle 43 fixed to the outer circumference of the shower ring 25. Additionally, the cleaning chamber 25a is provided, on its inner circumferential surface, with a sealing part 47, for example, an O-ring. The cleaning chamber 25a is formed so as to expand in a tapered shape as being headed from the sealing part 47 to the forward end. In the housing component 13, a drain hole 50 is formed so as to extend from the inner circumferential surface to the outer circumferential surface. In operation, cleaning liquid ejected from the nozzle hole 46 is drained through the drain hole 50.

As shown in FIG. 1, two reference marks 55 are formed on the outer circumference portion of the bellows holder 21, in positions opposed to each other. In the embodiment shown in the drawing, the reference marks 55 are notches. However, the reference marks 55 different from notches may be used so long as they do not interfere with the sliding action of the bellows holder 21.

As shown in FIG. 2, position sensors 51, 52 for detecting the position of the bellows holder 21 are attached to the housing of the socket 10, in positions opposed to each other. Specifically, the position sensors 51, 52 are provided in the housing component 15 so that respective tips of the position sensors 51, 52 extend to the inner circumferential surface of the sliding chamber 21' of the bellows holder 21 or just short of the inner circumferential surface. Therefore, even when the bellows holder 21 slides, there is no possibility that the circumferential surface of the bellows holder 21 comes into contact with the position sensors 51, 52.

In this embodiment, the position sensors 51, 52 are optical sensors for detecting the reference marks 55 provided in the bellows holder 21. As mentioned before, as the bellows holder 21 is integrated with the piston 26, the position of the piston 26 can be detected by detecting the position of the bellows holder 21 via the reference marks 55.

In the not-shown prior art, a position sensor for the piston 26 is arranged in the sliding chamber 27 in which the piston 26 slides. If the position sensor is arranged in the sliding chamber 27, however, by pressurizing the sliding chamber 27 through the intake and exhaust ports 28, 29, there is the risk of a position sensor's falling out of the sliding chamber 27. Even if the position sensor does not fall out, there is a possibility that air in the sliding chamber 27 leaks out through the attachment port of the position sensor, causing the pressure in the sliding chamber 17 to be precisely controlled with difficulty. Also, there is a possibility that the sensitivity of the position sensors is reduced when the position sensors are directly influenced due to pressurization in the sliding chamber 27.

On the contrary, according to the present invention, the tips of the position sensors 51, 52 are arranged in an area free from the influence of pressure in the sliding chamber 27, i.e., in the sliding chamber 21' for the bellows holder 21. Additionally, since the drain 42 is formed in the sliding chamber 21' for the bellows holder 21, there is no change in the pressure of the sliding chamber for the bellows holder 21 during the piston's sliding. Thus, in the present invention, the pressure in the sliding chamber 27 is not applied on the position sensors 51, 52 even when the piston 26 is sliding. Therefore, neither falling-out of the position sensors nor reduction in the sensitivity of the position sensors is produced. According to the present invention, furthermore, it is possible to precisely control the pressure in the sliding chamber 27 without air leakage through the attachment places of the position sensors 51, 52 when sliding of the piston 26. Note, as shown in FIG. 2, the position sensors 51, 52 are arranged on the opposite side of a support plate 35 in view from an inside passage 20. When the later-mentioned socket 10 is used, these position sensors 51, 52 are positioned on the upper side of the socket 10. Thus, the reference marks 55 arranged on the outer circumference of the bellows holder 21 are also positioned on the upper side of the socket 10. In such a case, grease movable downwardly in the sliding chamber 21' is unlikely to enter the reference marks 55 (notches) and the position sensors 51, 52 are unlikely to malfunction by inflowing the grease.

As can be seen from FIGS. 1 and 2, additionally, the support plate 35 is fixed to the proximal end of the rear cover 16 by two bolts 37. The support plate 35 is formed with two oval openings 36. As described later, a support shaft 39c can be fixed to the support plate 35 by inserting the other bolts 39b into the openings 36. For this purpose, it is preferable that the support plate 35 is made from material having a relatively-high rigidity.

Figure 3A:
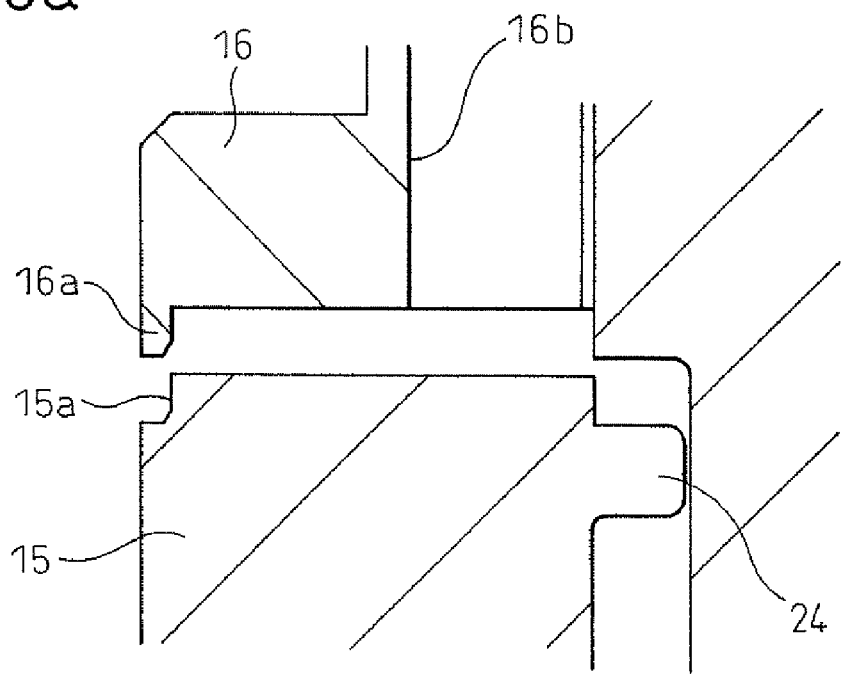
FIG. 3a is a partially-enlarged view showing a proximal end of a housing in enlargement.

According to the present invention, at least part of components forming the housing of the socket 10 is assembled in a spigot-and-socket manner. FIG. 3a is a partially-enlarged view showing the proximal end of the housing in enlargement. In FIG. 3a, a circular projection 16a is formed in the circumferential part of the rear cover 16 in advance. On the other hand, the housing component 15 in abutment with the rear cover 16 is formed with a circular groove 15a for engagement with the circular projection 16a.

In assembling, the housing component 15 is fitted to the rear cover 16 so that the circular groove 15a engages with the circular projection 16a. Consequently, the centering of the housing can be easily accomplished. Similar circular projections and grooves are formed in the other components, for example, the housing components 13, 14, as well. With the easiness in centering these components, by connecting these components 12 to 16 to each other through the bolts 31, 32, it becomes possible to improve the sealing characteristics of the socket 10 and shorten the manufacturing time of the housing.

Additionally, the sliding part in the socket 10, for example, the shower ring 25 and the piston 26 are also assembled to each other in the spigot-and-socket manner. As a matter of course, all immovable components in the socket 10 may be assembled in the spigot-and-socket manner.

It is apparent that sealing parts, for example, O-rings for air-tight and liquid-tight are arranged between the housing of the socket 10 and the sliding part, i.e. the piston 26 and the shower ring 25 or the like and also inside the entry 19 appropriately, although these sealing parts are not described in detail.

Figure 3B:
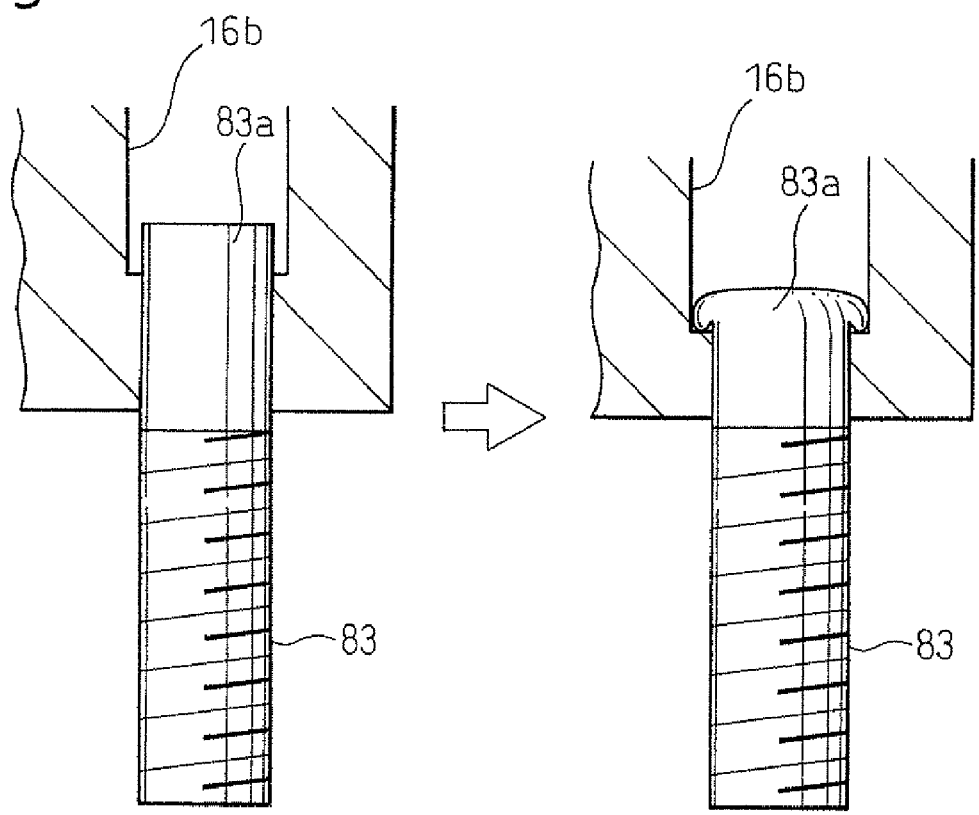
FIG. 3b is a detailed view showing details of a caulking structure.

Moreover, as shown in FIG. 1, a conduit 2 having a flange 3 is connected to the proximal end of the socket 10. The connection between the socket 10 and the conduit 2 is accomplished by means of a bolt 83 and a nut 89. In the present invention, the bolt 83 is provided with a caulked head portion. Thus, as shown with FIG. 3b as a detail view, before assembling, the bolt 83 is inserted into a hole 16b of the rear cover 16 and thereafter, the head portion 83a is flattened under pressure in the hole 16b.

If such a structure is not adopted, the flange 3 and the rear cover 16 would be separated from each other by a gap equivalent to a bolt's head since the head is positioned between the flange 3 and the rear cover 16. On the contrary, according to the present invention, the head portion 83a of the bolt 83 is positioned in the rear cover 16 and further caulked under pressure. As a result, according to the present invention, it is possible to minimize a distance between the flange 3 and the rear cover 16 as possible, allowing the whole socket 10 with the built-in conduit 2 to be small sized. Due to the above-mentioned constitution, it is possible to make a moment applied on a distal end of the socket 10 smaller.

Figure 4:
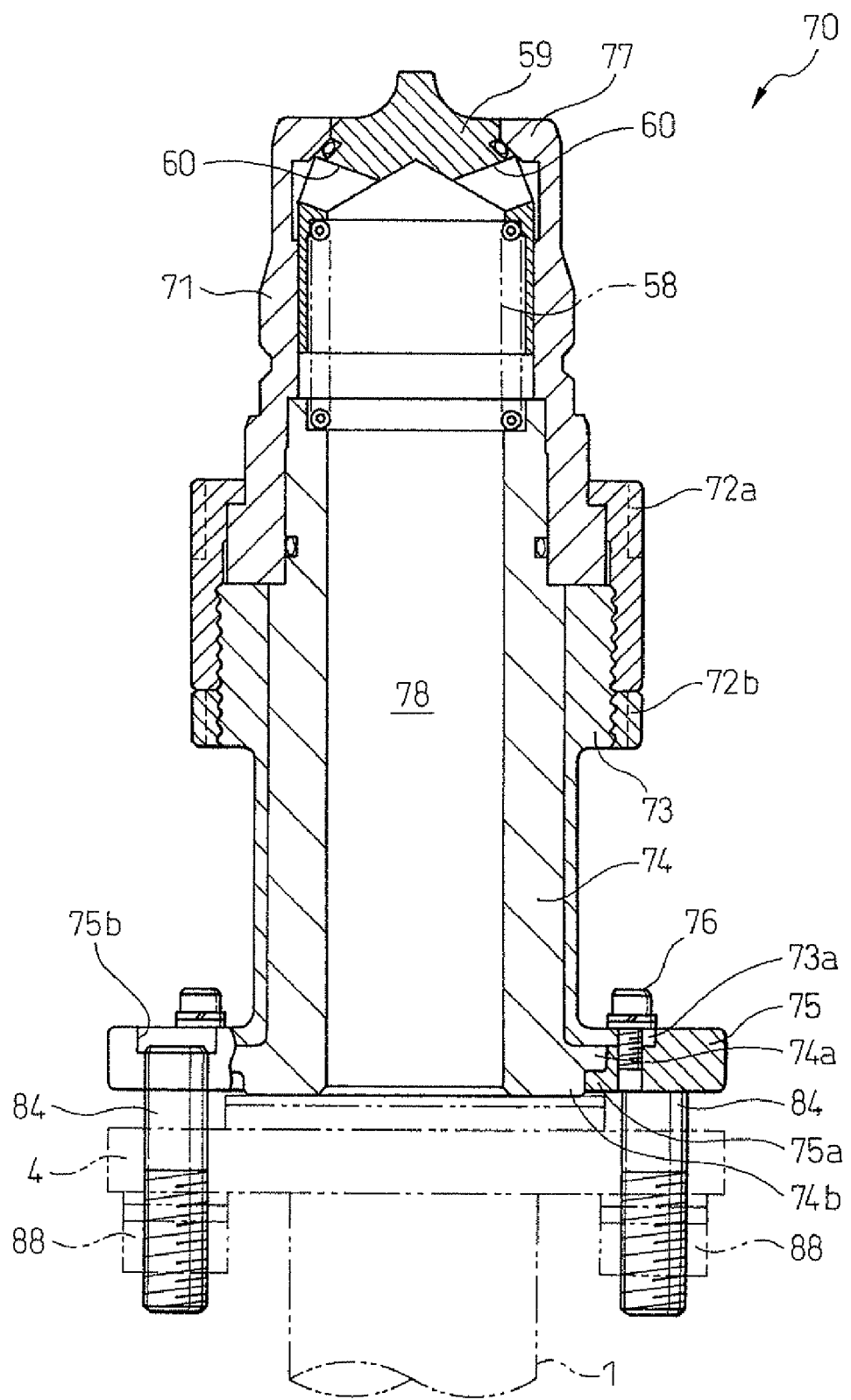
FIG. 4 is a longitudinal sectional view of a plug for the fluid-transfer coupling device in accordance with the present invention.

FIG. 4 is a longitudinal sectional view of a plug for the fluid-transfer coupling device in accordance with the present invention. The plug 70 of the invention includes a resinous inner spacer 74 having an inner passage 78 formed therein and a metal plug collar 73 covering the outer circumference portion of the inner spacer 74. As can be seen from FIG. 4, the inner spacer 74 has a flange 74a formed apart from a proximal end 74b of the inner spacer 74 at a predetermined distance.

The plug collar 73 is also provided, at a proximal end thereof, with a proximal-end flange 73a. The plug 70 is also provided with a metal plug flange 75. The plug flange 75 has a step part 75a formed around an opening at the center of the flange 75 to match respective profiles of the flange 74a and the proximal end 74b of the inner spacer 74.

Accordingly, when the inner spacer 74 is inserted into the plug collar 73, the flange 74a of the inner spacer 74 abuts on the proximal-end flange 73a of the plug collar 73 and comes to a standstill. Then, the forward end of the inner spacer 74 partially projects beyond the forward end of the plug collar 73. Then, from the proximal end of plug flange 75, the plug flange 75 is fitted to the plug collar 73 and successively, the plug collar 73 and the plug flange 75 are joined to each other by bolts 76. As a result, the flange 74a of the inner spacer 74 is securely pinched between the proximal-end flange 73a of the plug collar 73 and the step part 75a of the plug flange 75. Then, a plug forward part 71 is inserted in the forward end of the inner spacer 74 and thereafter, the part 71 and the inner spacer 74 are fixed to each other by double nuts 72a, 72b with the nut 72a pulling the plug forward part 71 down toward the collar 73 and the nut 72b locking against the nut 72a to hold the nut 72a in place.

In the not-shown prior art, the plug flange is composed of two half-moon shaped members in assembly. On the contrary, according to the present invention, the plug flange 75 can be formed by a single component due to the above-mentioned constitution. In other words, according to the invention, there is no need of providing the plug flange 75 composed of two divided parts, so that the manufacturing cost of the plug 70 can be saved. Additionally, with the above-mentioned constitution, if the plug flange 75 is damaged, it is possible to easily replace it with another flange and also possible to exchange it for another plug flange 75' of a different standard (diameter), for example, JIS•ANSI•DIN.

In the present invention, the outer circumference portion of the plug 70 is reinforced by the metal plug collar 73 and the plug flange 75, especially by the plug collar 73. Consequently, comparing with an entire resinous plug (not shown) in the prior art, the plug 70 of the invention is enhance in its rigidity. Thus, even if transferring a large quantity of fluid on condition that the plug 70 is inserted into the socket 10 as described later, the plug 70 is stably supported in the socket 10 and, it is possible to prevent a breakage of plug 70.

As shown in FIG. 4, the tip of the plug forward part 71 is in the form of a second valve seat 77 projecting inwardly. A second valve body 59 is urged toward the second valve seat 77 by a spring 58 disposed between the second valve body 59 and the forward end of the inner spacer 74. In the normal state, the second valve body 59 closes an opening of the second valve seat 77. Additionally, as shown in the figure, the second valve 59 is formed with a communication hole 60. When the second valve 59 is pushed against the urging of the spring 58, the communication hole 60 and the opening of the second valve seat 77 are opened together.

Note, a conduit 1 having a flange 4 is connected to the proximal end of the plug 70. The connection between the plug 70 and the conduit 1 is accomplished by means of bolts 84 and nuts 88. Respective head portions of the bolts 84 are arranged in holes 75b of the plug flange 75 and also caulked as similar to the structure mentioned with reference to FIG. 3b. As a result, in the present invention, it is possible to prevent the head portions of the bolts 84 from projecting from the surface of the plug flange 75 toward the forward end of the plug 70, facilitating an operator's grasping of the plug 70.

Figure 5:
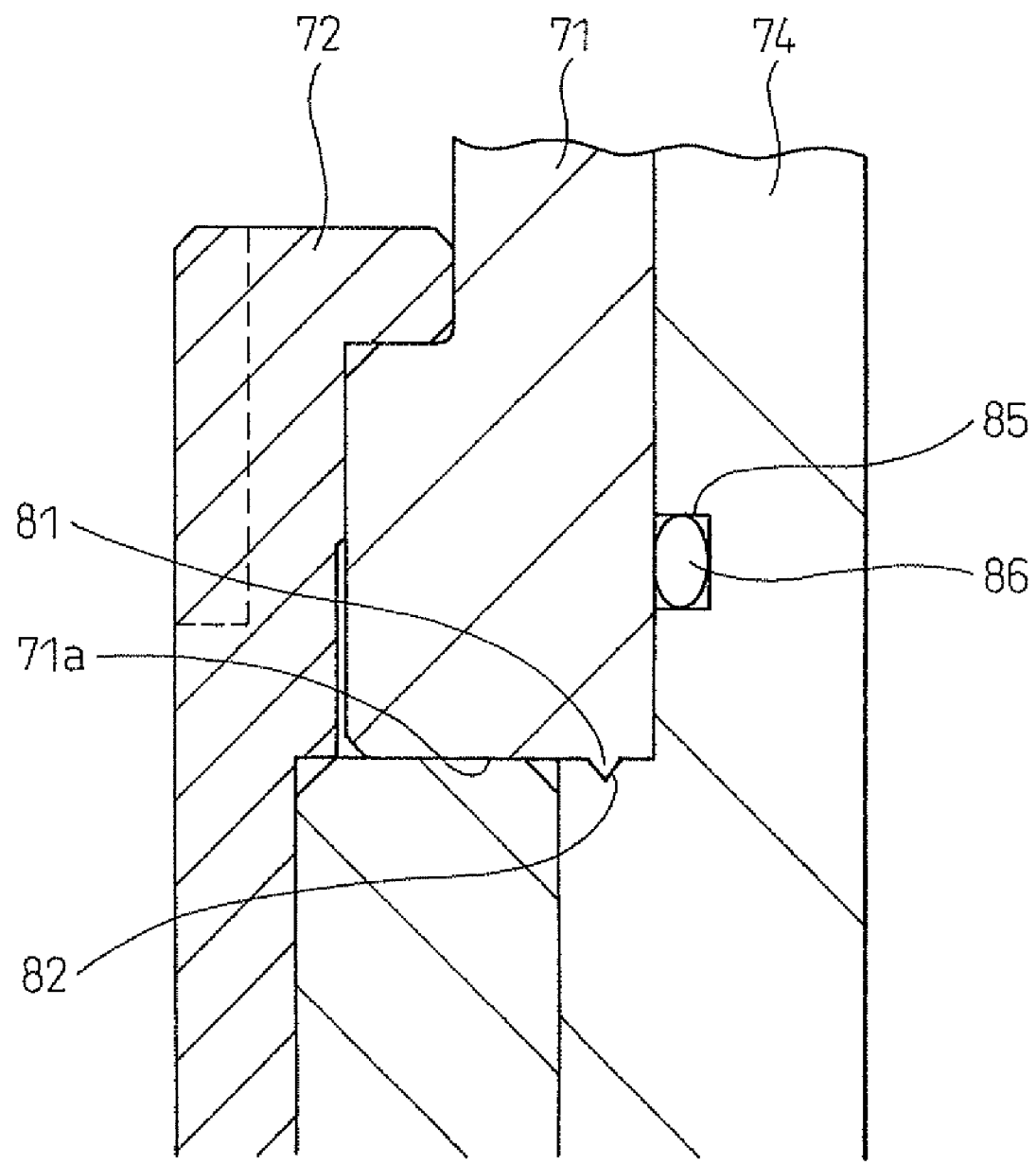
FIG. 5 is a partially-enlarged view showing a part of the plug in enlargement.

FIG. 5 is a partially-enlarged view showing a part of the plug in enlargement. As shown in FIG. 5, the inner spacer 74 is formed, on its outer circumferential surface, with a circular recess 85 in which a sealing part 86, for example, an O-ring is arranged. As shown in the figure, the sealing part 86 serves to prevent fluid from leaking out through a clearance between the plug forward part 71 and the inner spacer 74.

On the proximal end 71a of the plug forward part 71, a circular projection 81 projecting in the axial direction is formed in the circumferential direction of the part 71. A portion of the inner spacer 74 corresponding to the annular projection 81, may be formed with an annular recess 82 for receiving the annular projection 81. In this case, as shown in the figure, the annular projection 81 and the annular recess 82 are together formed outside the sealing part 86 in the radial direction. Thus, even if the fluid leaks out over the sealing part 86, the fluid can be prevented from leaking by the annular projection 81 and the annular recess 82.

Figure 6:
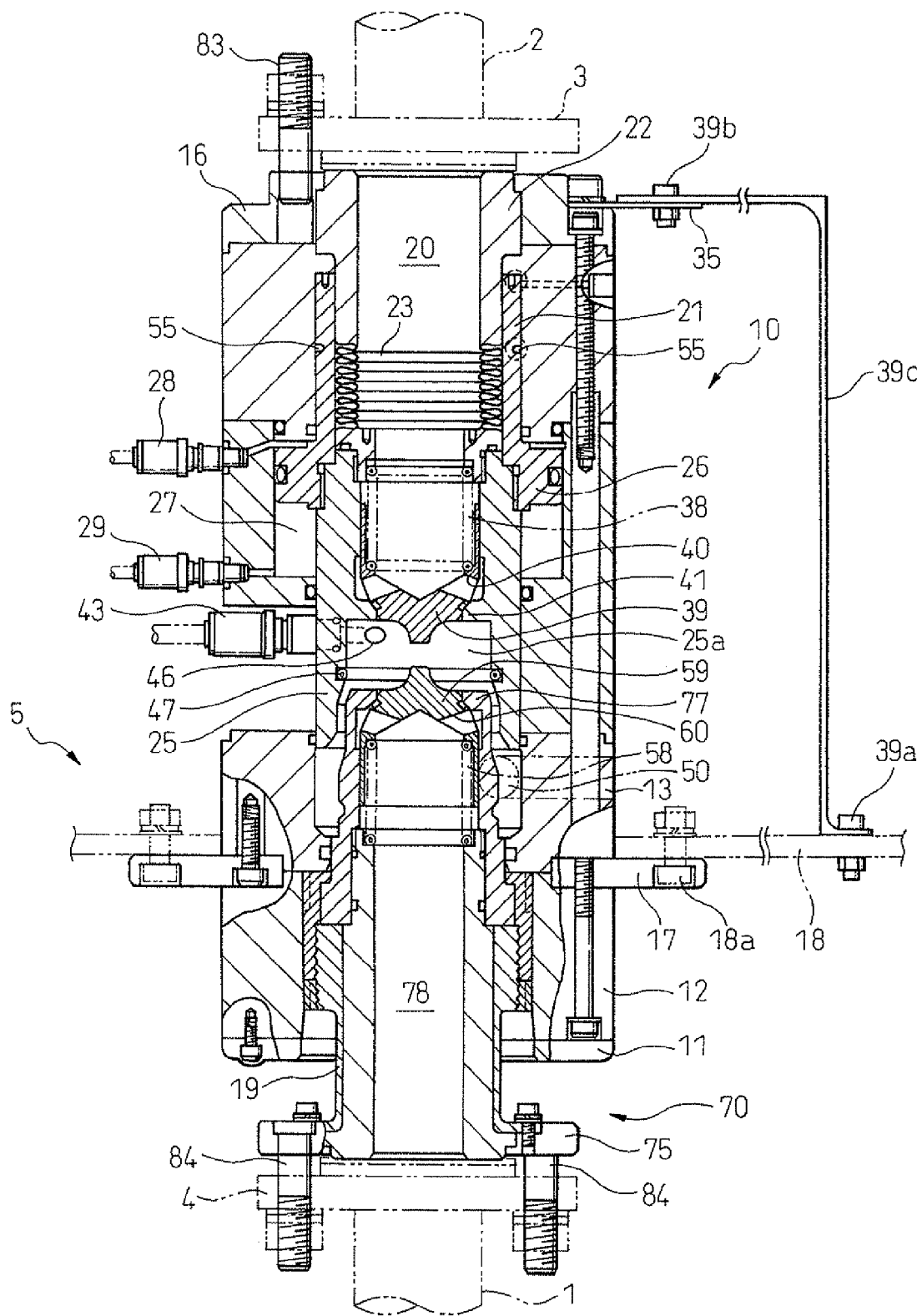
FIG. 6 is a longitudinal sectional view of the fluid-transfer coupling device, showing a condition where the plug is connected to the socket.
Figure 7:
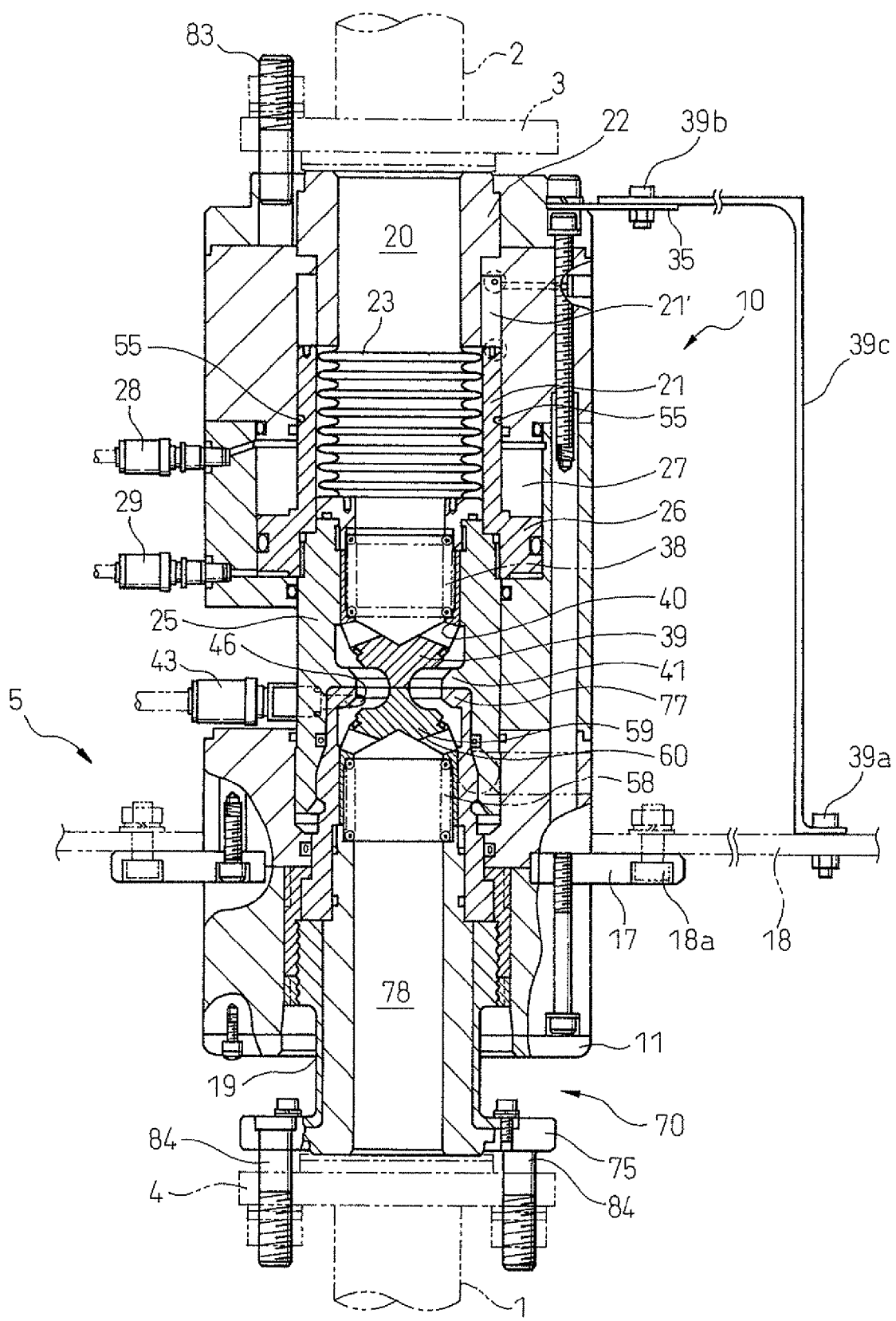
FIG. 7 is a longitudinal sectional view of the fluid-transfer coupling device, showing a condition where fluid can flow.

The operation of the fluid-transfer coupling device in accordance with the present invention will be described below. FIGS. 6 and 7 are longitudinal sectional views of the fluid-transfer coupling device, showing one condition to connect the plug with the socket and another condition to allow a circulation of fluid, respectively.

First of all, the side flange 17 of the socket 10 is attached to the mount panel 18 and further fixed thereto by the bolts/nuts 18a. Then, the support plate 35 of the rear cover 16 is fixed to one end of a support shaft 39c by a bolt/nut 39c. The support shaft 39c is formed by a substantially L-shaped member whose other end is fixed to the mount panel 18 by a bolt/nut 39a. The other end of the support shaft 39c may be fixed to a not-shown exterior member. Alternatively, the support shaft 39c may be formed to have the other configuration.

Then, the plug 70 connected to the conduit 1 is inserted into the entry 19 of the socket 10. Consequently, as shown in the figure, the forward end of the double nut 72a of the plug 70 abuts on the end surface of the housing component 13, so that the plug forward part 71 of the plug 70 projects into the housing component 13 and the shower ring 25.

As shown in the figure, when the plug 70 is inserted into the socket 10, there is produced a predetermined gap between the front cover 11 of the socket 10 and the plug flange 75 of the plug 70. This gap is enough large to receive a human's finger. Thus, in the present invention, since this structure facilitates an operator's grasping of the plug, it is possible for the operator to easily perform plugging/unplugging operations of the plug 70.

Then, when air is supplied from the intake/exhaust port 28 into the sliding chamber 27, the piston 26 slides toward the forward end of the chamber 27, together with the bellows holder 21 and the shower ring 25 both integrated with the piston 26. Then, after the outer circumferential surface of the plug forward part 71 abuts on the sealing part 47, the first valve body 39 and the second valve body 59 push one another against the springs 38, 58. Consequently, the first valve seat 41 and the second valve seat 77 abut with each other, so that both the communication hole 40 and the communication hole 60 are opened together. As a result, the fluid supplied through the conduit 1 is transferred to the conduit 2 through the inner passage 20 in the proximal end adaptor 22.

As mentioned before, according to the present invention, the side flange 17 is fixed to the mount panel 18 and the socket 10 is supported by the mount panel 18 through the use of the support plate 35 and the support shaft 39c. Therefore, even if the flow rate of fluid is relatively large when transferring the fluid, the socket 10 is stably supported by the mount panel 18. Thus, due to load applied between the side flange 17 and the mount panel 18, it is possible to allow these elements to retain the sealing characteristics for the long term.

After transferring a desired quantity of fluid, air is supplied from the intake/exhaust port 29 into the sliding chamber 27, so that all of the piston 26, the bellows holder 21 and the shower ring 25 slide toward the proximal end of the socket 10 for respective initial positions. As a result, the first valve body 39 and the second valve body 59 are separated from each other and seated on the first valve seat 41 and the second valve seat 77 due to the urging action of the springs 38, 58, respectively. Thus, the communication holes 40, 60 are together closed to complete the transfer of fluid.

It is also possible to clean up the cleaning chamber 25a of the shower ring 25 when the piston 26 etc. is positioned in the initial position. After the cleaning water is jet-sprayed from the shower nozzle 43, the cleaning water flows toward the forward end of the shower ring 25 in a spiral whirl along the inner surface of the ring 25 since the nozzle hole 46 is orientated in the tangential direction of the inner surface of the ring 25. Then, after reaching the tapered surface, the cleaning water advances along the outer circumferential surface of the plug 70. In this way, the outer circumferential surface of the plug 70 is cleaned up by such vigorous cleaning water, exhaustively and certainly. Thereafter, the cleaning water is led to the forward end along the tapered surface and further discharged from the drain hole 50.

Note, as can be seen from FIG. 1, even when the piston 26 is in its retracted position, the cleaning chamber 25a is positioned somewhat apart from the sliding chamber 27 in the longitudinal direction. When the piston 26 slides to the furthest position (see FIG. 7), the cleaning chamber 25a further departs from the sliding chamber 27. Thus, according to the present invention, there is no possibility that lubricant in the sliding chamber 27, for example, grease flows into the cleaning chamber 25a.

In addition, although the support plate 35 and the support shaft 39c are respectively formed by different members in the above-mentioned embodiment, an arrangement where the support plate 35 and the support shaft 39c are united to one integrated member would be contained in the scope of the present invention.

FIG. 8 is a flow diagram including the coupling device of the present invention. In FIG. 8, the conduit 2 extended from the socket 10 is connected to a chemical source through a supply valve 2a. On the other hand, the conduit 1 extended from the plug 70 is connected to a carrier tank 99 through a valve. Thus, when the coupling device in which the plug 70 is connected to the socket 10, is used, chemicals are supplied to the carrier tank 99 through the socket 10 and the plug 70. In addition, the intake/exhaust ports 28, 29 are respectively connected to an air source through respective speed controllers, a cylinder operating valve and a pressure regulator, as shown in the figure.

A pipe 90 interposing a pressure sensor 90a is connected to the shower nozzle 43. As shown in the figure, the pipe 90 is branched to a nitrogen branch pipe 91 and a pure-water branch pipe 92. The branch pipe 91 interposes a check valve 95 and a stop valve 93, while the branch pipe 92 interposes a check valve 96 and a stop valve 94. Further, a pipe 90' extended from the drain hole 50 interposes a drain valve 97 and a drain trap 98 and is connected to a cleaning-water drain.

When cleaning the shower ring 25 in the socket 10, the stop valve 94 is opened to allow purified water to flow through the branch pipe 92 and the pipe 90. Then, the pure water is supplied from the shower nozzle 43 to the cleaning chamber 25a of the shower ring 25. In the present invention, since the check valves 95, 96 are interposed in the branch pipes 91, 92 respectively, there is no possibility that the pure water flowing through the branch pipe 92 during cleaning flows into the upstream side of the branch pipe 91 over the check valve 95.

After cleaning up the cleaning chamber 25a and the outer circumference of the plug 70, the pure water is supplied to the drain trap 98 through the pipe 90' from the drain hole 50. It is noted that after using the socket 10 in order to feed a specific chemicals, the chemicals may stick to the inner wall of the cleaning chamber 25a and the outer circumference surface of the plug 70 as residual. According to the present invention, this residual is swept away by the purified water and successively, the waste fluid containing the residual is trapped by the drain trap 98.

After completing the cleaning operation, the stop valve 94 in the branch pipe 92 is closed and the stop valve 93 in the branch pipe 91 is opened. After that, nitrogen gas is fed through the branch pipe 91 and the pipe 90 and supplied into the cleaning chamber 25a from the shower nozzle 43. In this situation, the check valve 96 in the branch pipe 92 also serves to prevent nitrogen gas from flowing into the upstream side of the branch pipe 92 over the check valve 96. The purified water remaining in the cleaning chamber 25a is swept away through the drain hole 50 due to the supply of nitrogen gas and subsequently trapped by the drain trap 98. Alternatively, the cleaning pure water is vaporized in the cleaning chamber 25a. Thereafter, by closing the stop valve 93, the socket 10 can be brought into a reusable condition. In this connection, it is obvious that the chemicals from the carrier tank 99 can be supplied to the socket 10 and members on the side of the socket 10 in the same way.

Figure 9A:
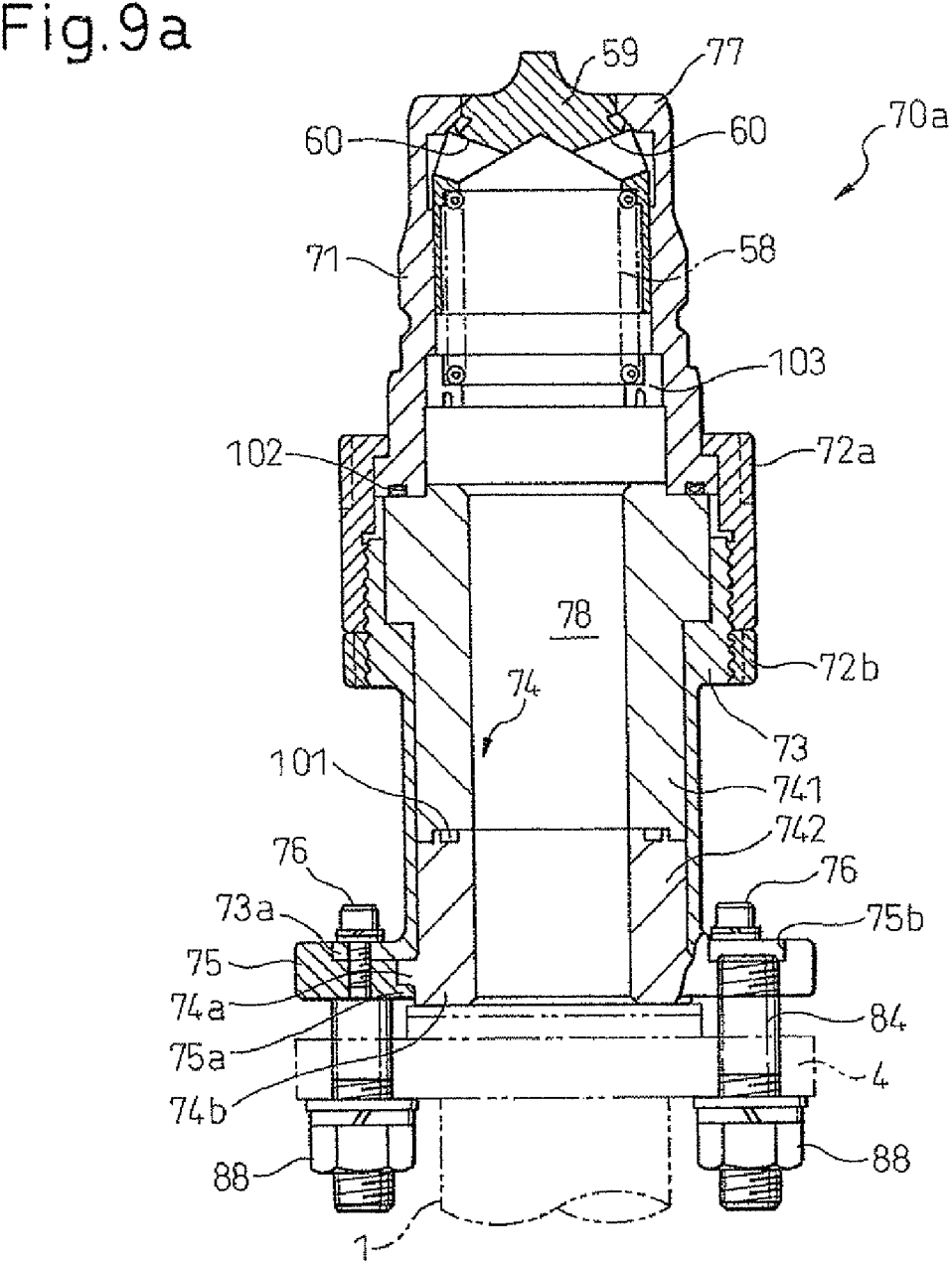
FIG. 9a is a longitudinal sectional view of the plug in accordance with another embodiment of the present invention.
Figure 9B:
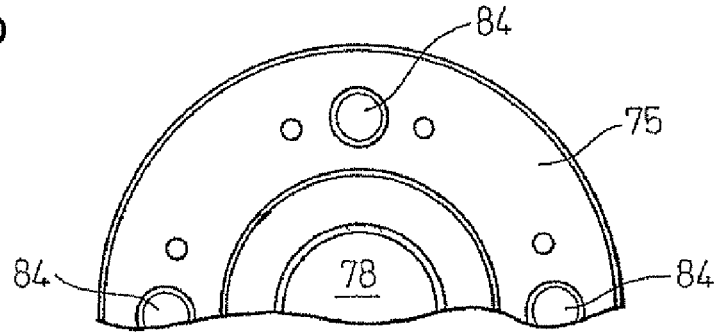

FIG. 9a is a longitudinal sectional view of the plug socket in accordance with another embodiment of the present invention. FIG. 9b is an end view of the plug shown in FIG. 9a. In the plug 70a shown in these figures, the inner spacer 74 comprises a first inner spacer part 741 on the side of the forward end of the plug 70a and a second inner spacer part 742 on the side of the proximal end of the plug 70a. As shown in figures, the second inner spacer part 742 is arranged between the first inner spacer part 741 and the plug flange 75. The first inner spacer part 741 and the second inner spacer part 742 are arranged so as to abut against each other in the longitudinal direction of the plug 70a, defining an inner passage 78.

As shown in FIG. 9a, a seal part 101, for example, an O-ring is arranged between the proximal end of the first inner spacer part 741 and the forward end of the second inner spacer part 742. The seal part 101 is arranged in an annular recess formed on the forward-end surface of the second inner spacer part 742. Additionally, a seal part 102, for example, another O-ring is arranged on the end face of the plug forward part 71 engaging with the forward-end surface of the inner spacer part 741.

In the other embodiment shown in FIGS. 9a and 9b, a holder part 103 for screwing to a thread on an inner circumferential surface of the plug forward part 71 is arranged on a step part formed in the part 71. As shown in the figures, the holder part 103 supports one end of the spring 58. Thus, in FIG. 9a, the spring 58 is retained between the second valve body 59 and the holder part 103. In other words, in the embodiment of FIGS. 9a and 9b, the forward end of the inner spacer 74 does not support the spring 58 (see also FIG. 4, in this regard).

In the assembled state of the plug 70a of the other embodiment, both the second valve body 59 and the spring 58 are retained in the plug forward part 71 by the holder part 103. The first inner spacer part 741 is the inserted into the plug collar 73 through its forward end. The plug forward part 71 is assembled to the forward end of the first inner spacer part 741 and successively, the parts 71, 741 are fixed to each other by means of double nuts 72*a*, 72*b*. As with FIG. 4, the nut 72*a* pulls the plug forward part 71 toward the inner spacer part 741 to press the seal part 102 between the plug forward part 71 and the first inner spacer part 74 with the nut 72 locking against the nut 72*a* to hold the nut 72*a* in place. After that, from the side of the proximal-end flange 73*a*, the second inner spacer part 742 is inserted into the plug collar 73 and successively, the plug flange 75 is assembled to the second inner spacer part 742. Finally, the plug collar 73 is joined to the plug flange 75 by bolts 76.

In the assembled plug 70*a*, the first inner spacer part 741 and the second inner spacer part 742 are urged to each other in the longitudinal direction of the plug 70*a* due to the fastening action of the double nuts 72*a* and the bolts 76. Therefore, it is possible to enhance the sealing characteristics of the seal part 101 between the first inner spacer part 741 and the second inner spacer part 742.

It should be understood that the sealing characteristics of the seal part 102 between the plug forward part 71 and the first inner spacer part 741 is enhanced in comparison with the sealing characteristics of the seal part between the plug forward end 71 and the inner spacer 74 shown in FIG. 4.

Further, in the embodiment shown in FIG. 9*a*, if detaching the bolts 76 from the plug 70*a*, only the plug flange 75 and the second inner spacer part 742 can be separated from the plug 70*a*. Even in such a situation, the other members forming the plug 70*a* are not separated from each other, remaining their assembled state. On the contrary, in the embodiment shown in FIG. 4, if detaching the bolts 76 to separate the inner spacer 74 from the plug 70, then it causes the spring 58 and the second valve body 59 to be separated from the plug 70.

Figure 10A:
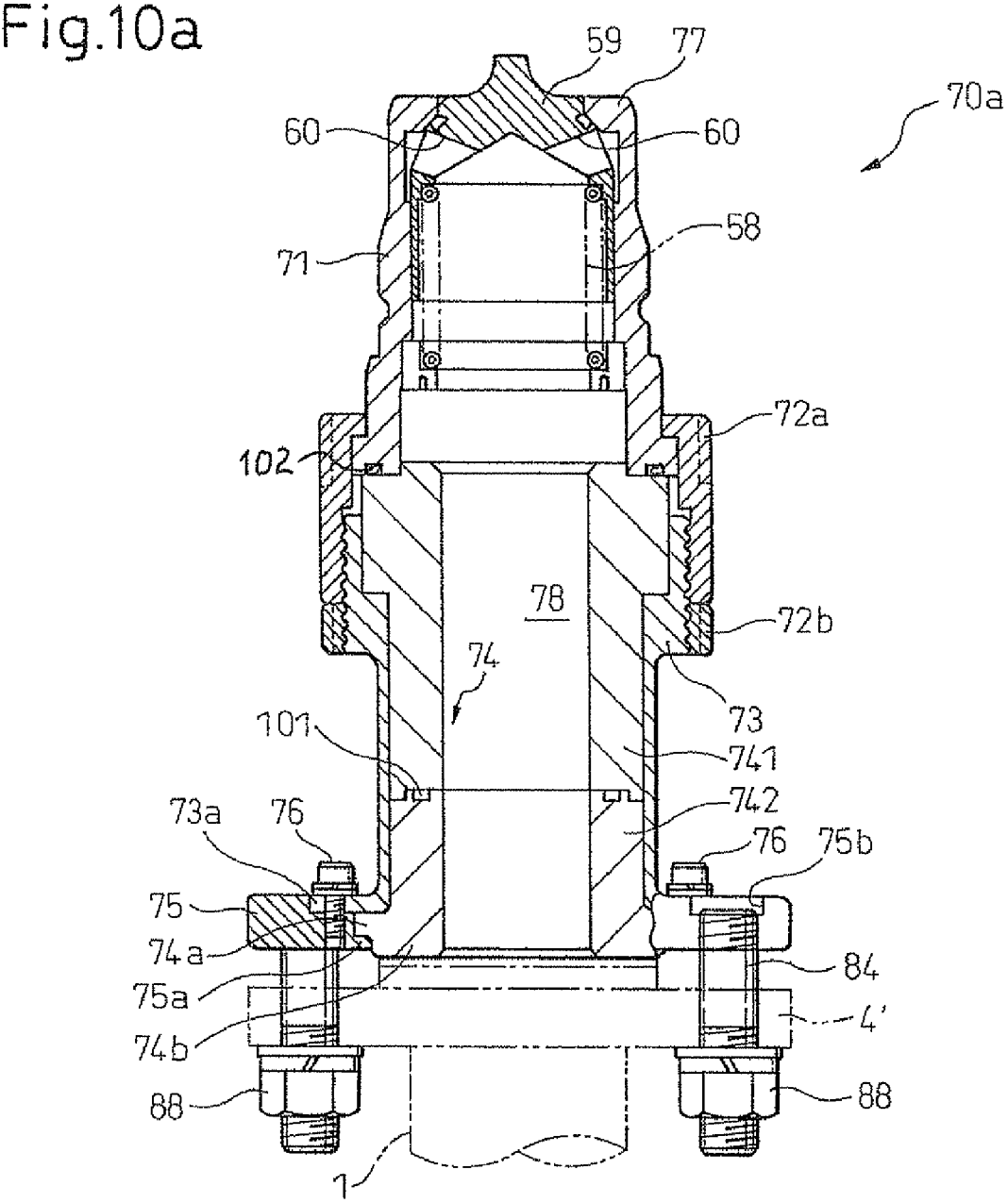
Figure 10B:
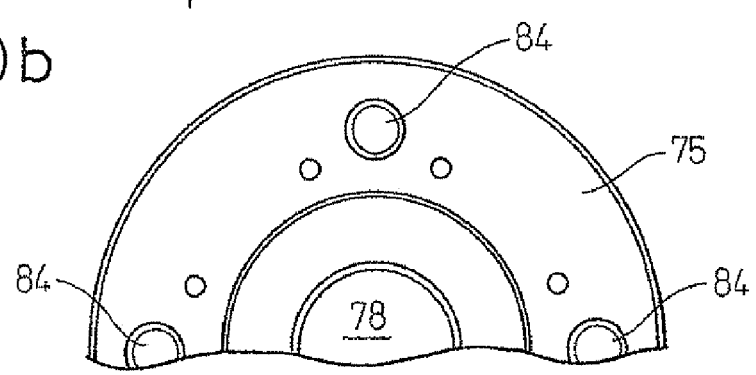

FIG. 10*a* is a longitudinal sectional view of the plug mounted on a different flange from that of FIG. 9*a*. FIG. 10*b* is an end view of the plug of FIG. 10*a*. In the plug 70*a* shown in FIG. 10*a* is identical to that of FIGS. 9*a* and 9*b* except for dimensions of both the plug flange 75 and the flange 4. In other words, a plug flange 75*a* and a flange 4' of FIGS. 10*a* and 10*b* are formed with diameters larger than those of the plug flange 75 and the flange 4 of FIGS. 9*a* and 9*b*, respectively. The nuts 72*a* and 72*b* function as in FIGS. 4 and 10*a*.

It is possible to detach the plug flange 75 and the second inner spacer part 742 from the plug 70*a* of FIG. 9*a* and subsequently assemble the large-diameter plug flange 75*a* of FIG. 10*a* to the plug 70*a* together with the second inner spacer part 742. In other words, according to this embodiment, it is possible to attach the plug flange 75*a* having different dimensions to the plug 70*a* without disassembling it as a whole, and such a structure would be advantageous in applying the plug 70*a* to the other conduit 1 having the different-dimension flange 4' attached thereto.

As can be seen from FIG. 9*a*, even if detaching the plug flange 75 and the second inner spacer part 742, there is no possibility that the spring 58 will separated from the plug 70*a*. Accordingly, in the embodiment of FIG. 9*a*, the spring 58 may be supported by the forward end of the first inner spacer part 741. Such an arrangement is within the scope of the present invention.

The invention claimed is:

1. A plug for a fluid-transfer coupling device that connects the plug and a socket to each other thereby communicating respective flow paths in the socket and the plug with each other, the plug comprising at least:
   a plug forward part having a valve body and an inner passage formed to allow a passage of fluid;
   a plug collar arranged adjacent to the plug forward part in an axial direction of the plug;
   an inner spacer having an inner passage formed to communicate with the inner passage of the plug forward part and inserted into a portion of the plug forward part and into the plug collar;
   a flange formed on a proximal end of the plug to connect the plug to a conduit, and
   a nut, which is coaxial to the plug, arranged around an outer circumferential surface at a proximal end of the plug forward part and an outer circumferential surface at a distal end of the plug collar to fix them together;
   wherein
   the plug collar and the flange are made from metal; and
   wherein an O-ring, which is coaxial to the plug, is arranged between the plug forward part and the inner spacer.

2. The plug for the fluid-transfer coupling device of claim 1, wherein
   the inner spacer is provided, at a proximal end thereof, with a circular projection extending in the circumferential direction of the inner spacer, and
   the circular projection is interposed between a proximal end of the plug collar and a circular step part of the flange.

3. The plug for the fluid-transfer coupling device of claim 1, wherein
   a gap suitable for receiving a finger of an operation is defined between the flange of the plug and the socket when the plug is connected to a socket.

4. The plug for the fluid-transfer coupling device of claim 1, wherein
   the inner spacer includes a first part positioned on the side of a forward end of the plug and a second part arranged between the first part and the flange,
   only the second part and the flange are separated from the plug in an assembled state.

5. The plug for the fluid-transfer coupling device of claim 4, wherein
   another seal part is formed between the first part and the second part.

6. The plug for the fluid-transfer coupling device of claim 1, wherein the nuts comprise first and second nuts threaded on an external surface of the plug collar part; the first nut engaging the plug forward part and pulling the plug forward part toward the distal end of the plug collar upon advancing the first nut and the second nut locking the first nut against rotation upon being advanced against the first nut.

* * * * *